(12) United States Patent
Ishigaki

(10) Patent No.: US 10,431,377 B2
(45) Date of Patent: Oct. 1, 2019

(54) HIGH EFFICIENCY MAGNETIC COMPONENT

(71) Applicant: TOYOTA MOTOR ENGINEERING & MANUFACTURING NORTH AMERICA, INC., Erlanger, KY (US)

(72) Inventor: Masanori Ishigaki, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 447 days.

(21) Appl. No.: 14/670,081

(22) Filed: Mar. 26, 2015

(65) Prior Publication Data

US 2016/0284459 A1    Sep. 29, 2016

(51) Int. Cl.
  *H01F 30/16*    (2006.01)
  *H01F 38/14*    (2006.01)
  *H02J 50/70*    (2016.01)

(52) U.S. Cl.
  CPC ............. *H01F 38/14* (2013.01); *H01F 30/16* (2013.01); *H02J 50/70* (2016.02)

(58) Field of Classification Search
  USPC ........................................................ 336/229
  See application file for complete search history.

(56) References Cited

U.S. PATENT DOCUMENTS

| | | | | |
|---|---|---|---|---|
| 1,653,951 A | * | 12/1927 | Featherstone | H01F 17/02 140/71 R |
| 1,994,767 A | * | 3/1935 | Heintz | H01F 41/041 205/76 |
| 2,181,899 A | * | 12/1939 | Kennedy | H05B 6/362 219/670 |
| 2,963,669 A | | 12/1960 | Salisbury | |
| 3,506,865 A | * | 4/1970 | Briggs | H05H 7/00 313/62 |
| 4,581,598 A | | 4/1986 | York | |
| 5,793,272 A | | 8/1998 | Burghartz et al. | |
| 6,028,558 A | * | 2/2000 | Van Voorhies | H01Q 1/36 343/742 |
| 6,492,708 B2 | | 12/2002 | Acosta et al. | |
| 7,154,368 B2 | * | 12/2006 | Sweeney | H01F 41/08 336/229 |
| 7,283,029 B2 | | 10/2007 | Weon et al. | |
| 7,375,611 B1 | | 5/2008 | Pleskach et al. | |
| 7,808,359 B2 | | 10/2010 | Rao | |

(Continued)

FOREIGN PATENT DOCUMENTS

JP    2010-93145    4/2010

*Primary Examiner* — Ronald Hinson
(74) *Attorney, Agent, or Firm* — Oblon, McClelland, Maier & Neustadt, L.L.P.

(57) ABSTRACT

A magnetic air core apparatus that includes a first toroid formed of a plate like structure wrapped in a helical shape and including an air core, further the plate like structure has an outer peripheral surface and an inner peripheral surface, a second toroid that substantially envelopes the first toroid in a concentric manner. The first and second toroids have a first air gap provided therebetween. A start terminal is connected to the first toroid and a return terminal is connected to the second toroid, the start and return terminals enable connections to other electrical devices.

16 Claims, 20 Drawing Sheets

(56) References Cited

U.S. PATENT DOCUMENTS

| | | | |
|---|---|---|---|
| 8,354,325 B1 * | 1/2013 | Dao | H01L 28/10 257/E21.022 |
| 8,716,991 B1 | 5/2014 | Ikriannikov | |
| 2005/0156703 A1 | 7/2005 | Twaalfhoven | |
| 2013/0241309 A1 | 9/2013 | Arnold et al. | |
| 2014/0240071 A1 | 8/2014 | Alderton | |

* cited by examiner

Background

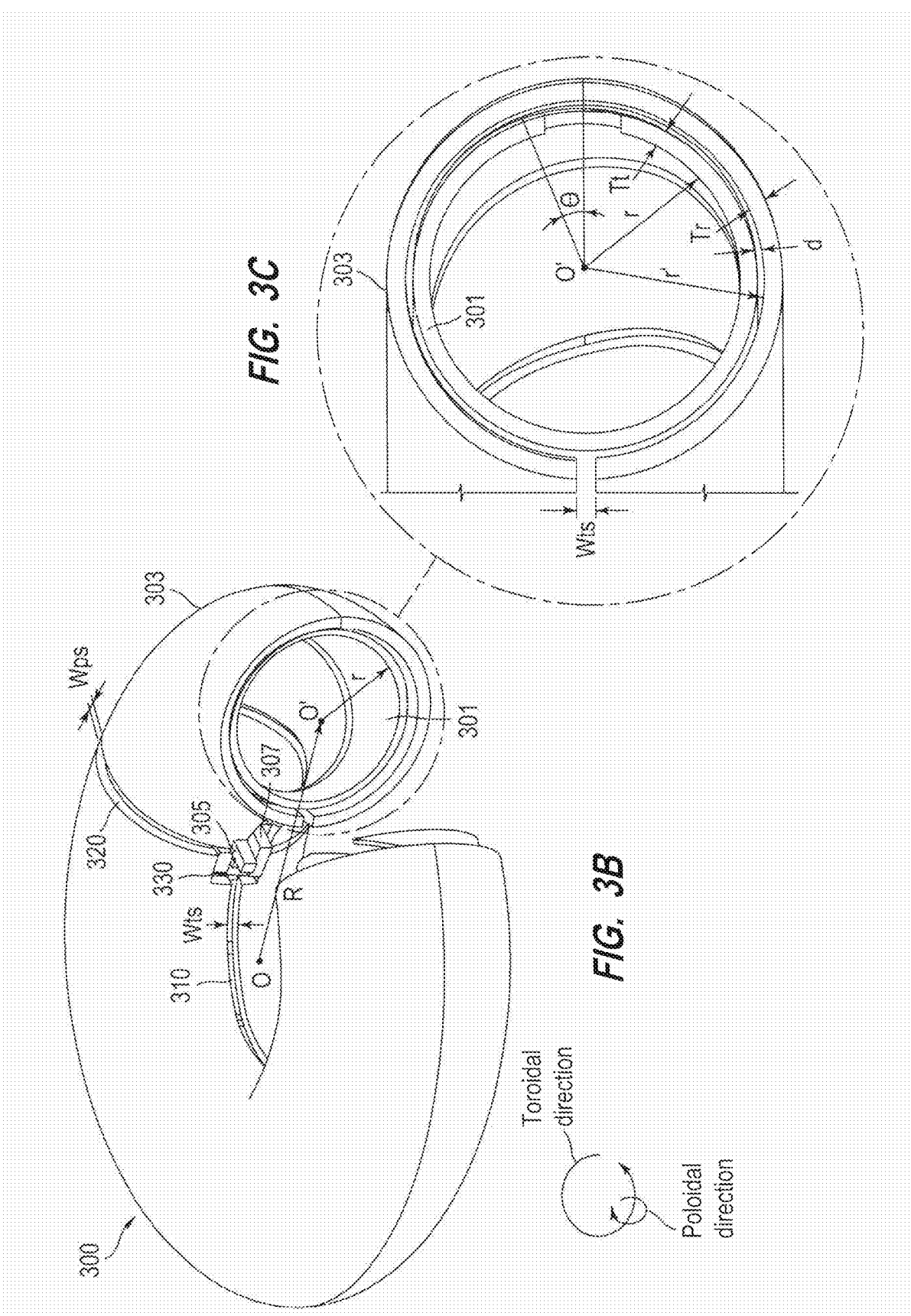

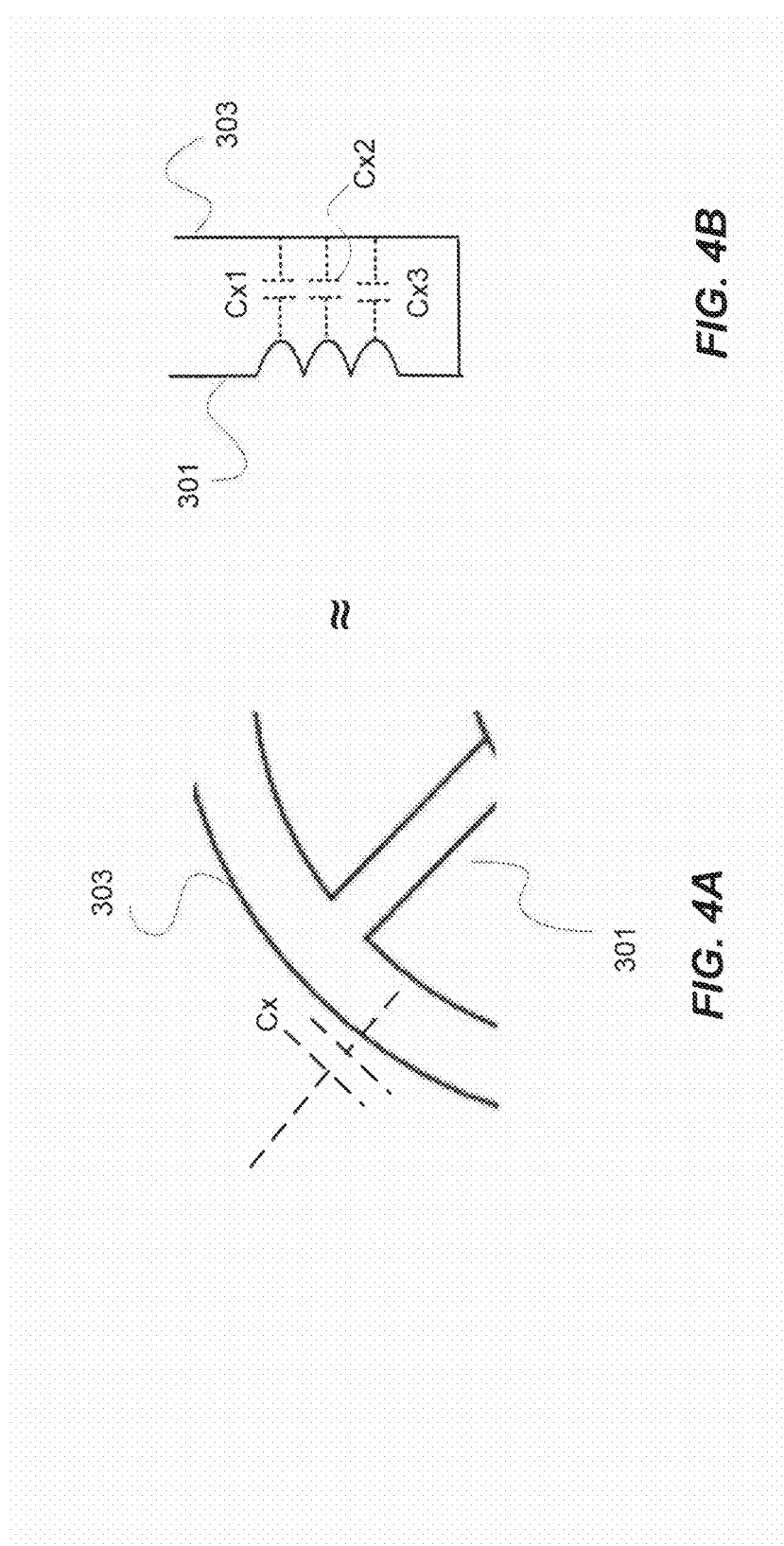

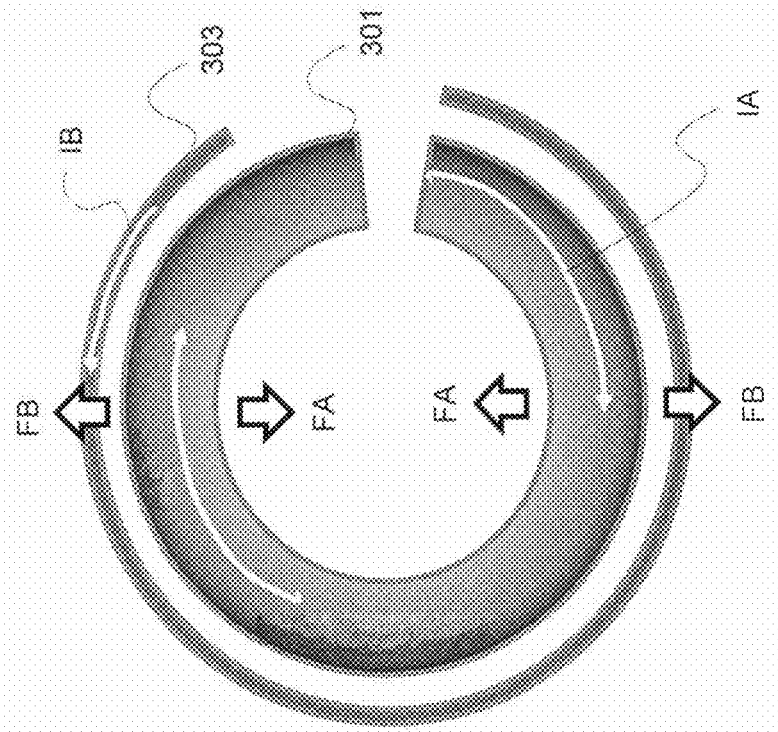
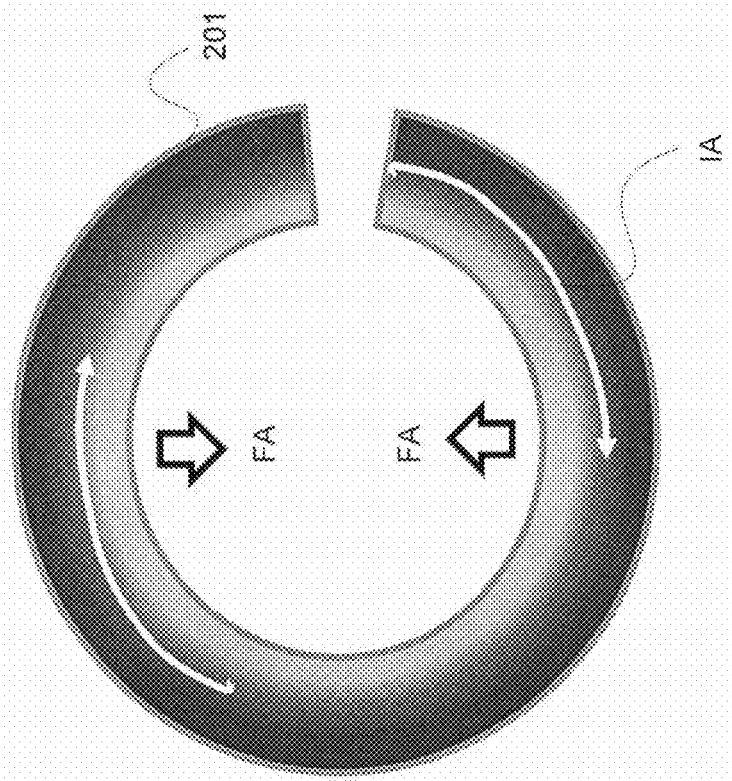
FIG. 5B
FIG. 5A

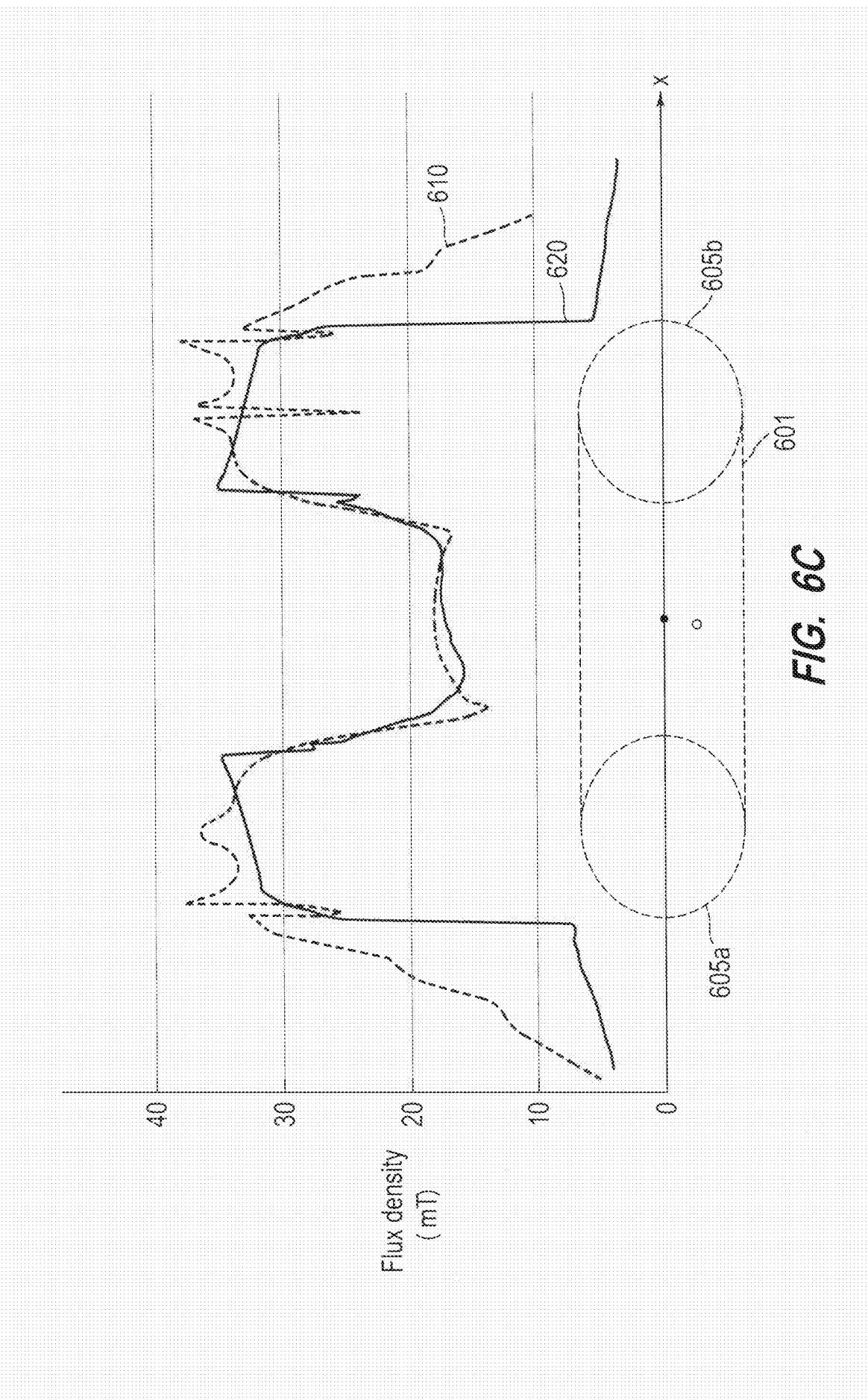

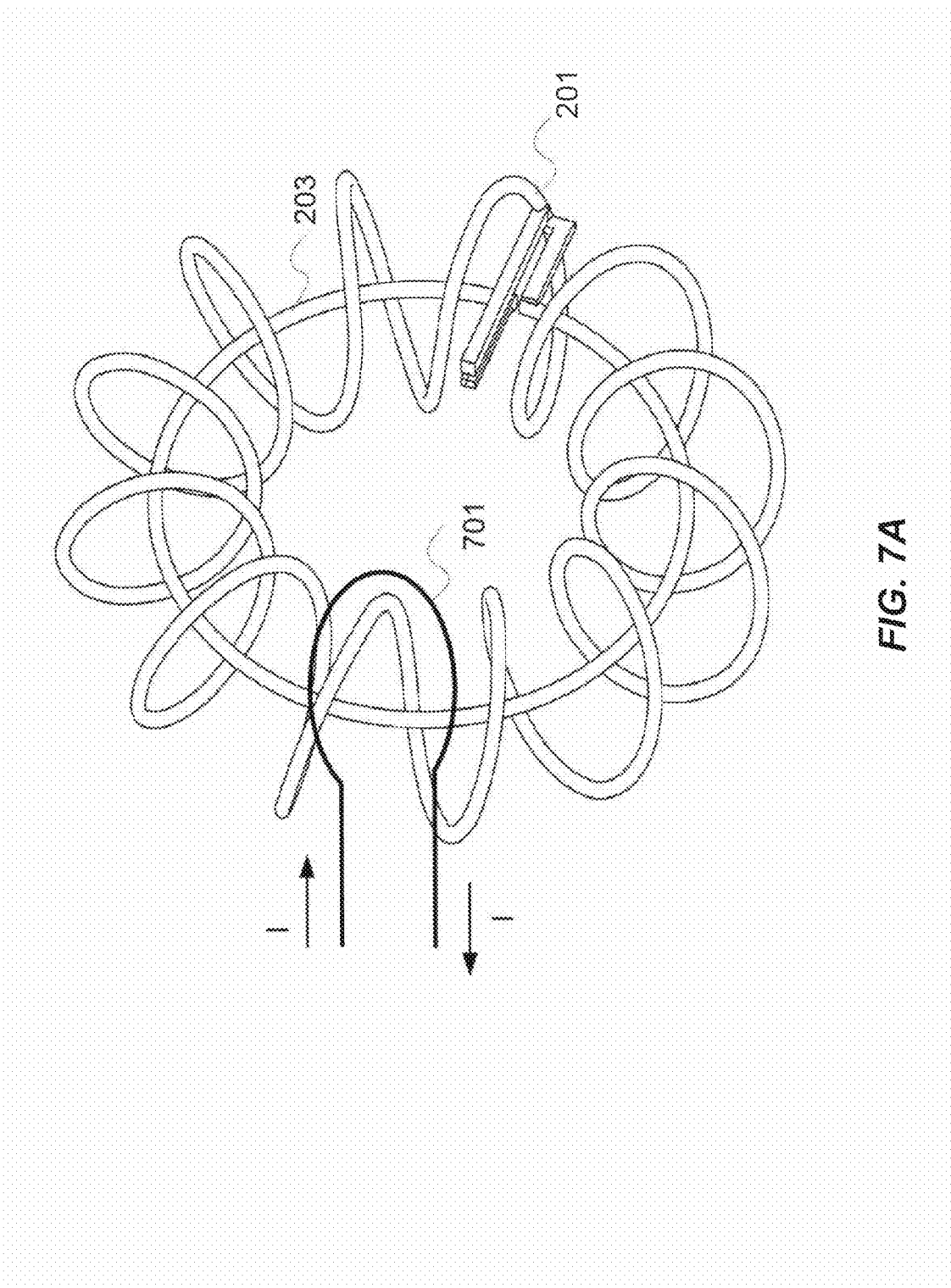

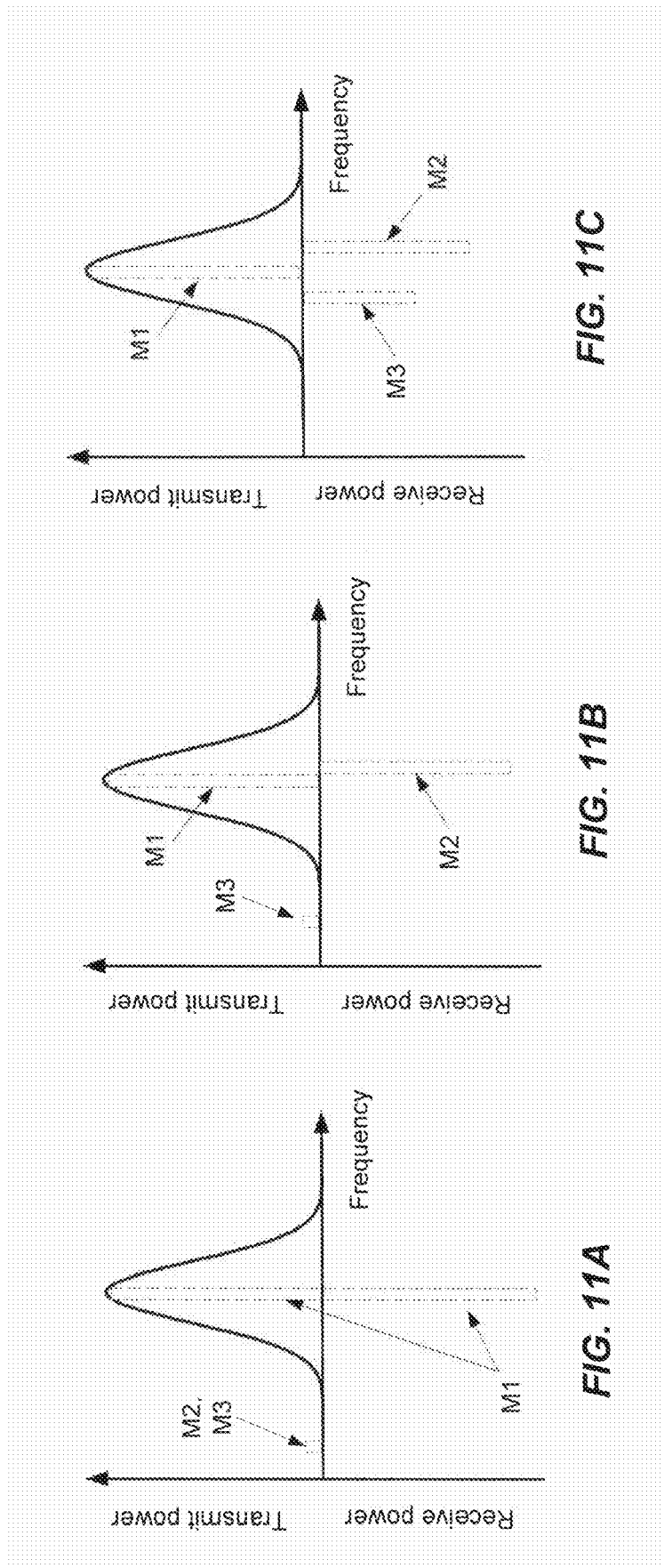

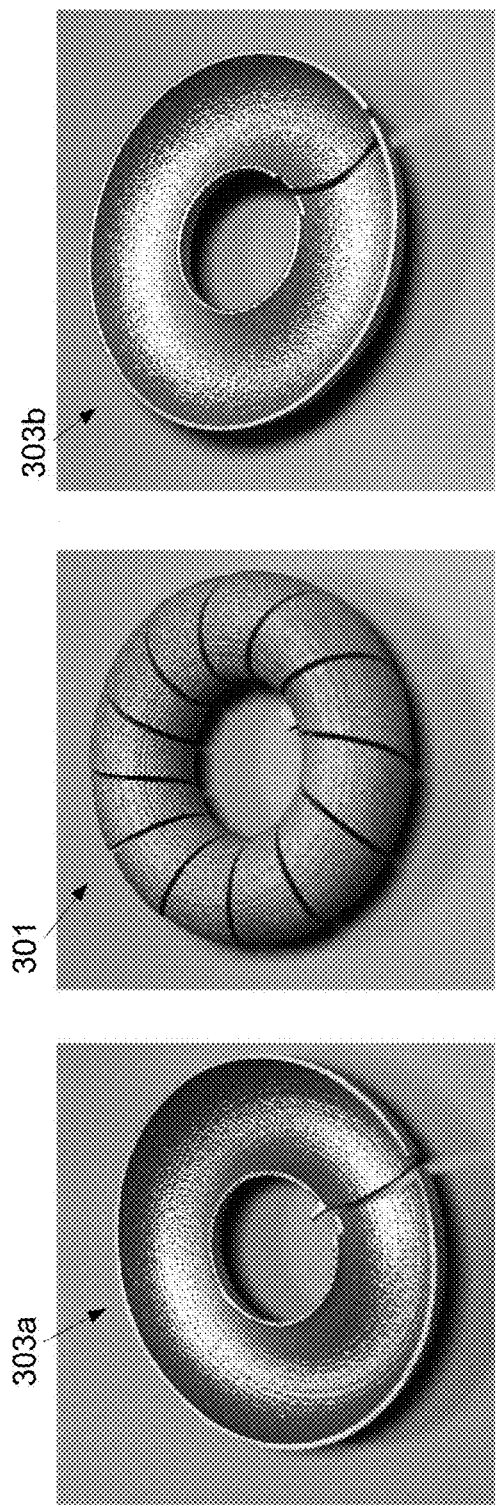
FIG. 12C
FIG. 12B
FIG. 12A
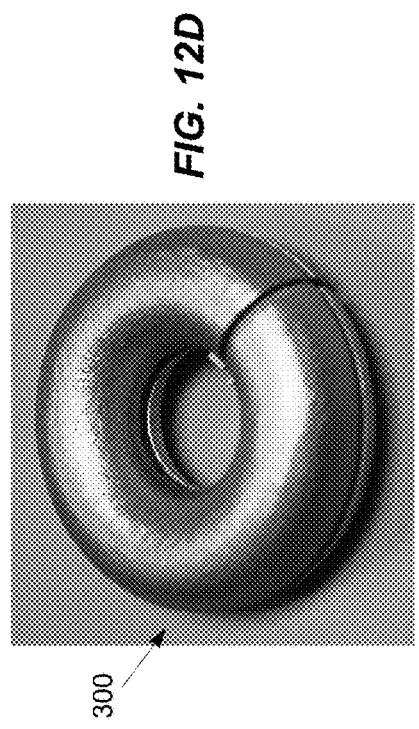
FIG. 12D

HIGH EFFICIENCY MAGNETIC COMPONENT

BACKGROUND

Field of the Disclosure

This application relates generally to air core magnetic components. More particularly the present disclosure relates to high frequency cores made of a toroidal magnetic material that can be energized by passing electric current.

Description of the Related Art

A magnetic core is an important component of electrical, electromechanical and magnetic devices. The magnetic core confines and guides magnetic fields in a circuit. For example, a typical inductor consists of a coil that creates flux, a magnetic core that directs flux, and an air gap, that stores magnetic energy. The air gap is made of two flat faces of iron within the magnetic core. Several factors define the performance characteristics of a magnetic core including the geometry, permeability and hysteresis properties, amount of air gap, operating frequency, magnetic material, etc. Magnetic cores are available in many shapes each having different characteristic behavior. Typically, it is desired to select a magnetic core having highest efficiency, and low flux leakage.

Toroid shape magnetic cores are often found very effective for many wide band frequency application, power transformers, and inductors. The toroidal core is formed either by winding a thin strip of magnetic material continuously, like a tape, or by using powder iron that is pressed and compacted into toroidal shape. An ideal coil is distributed evenly all around the circumference of the toroid. The symmetry of this geometry creates a magnetic field of circular loops inside the core, and the lack of sharp bends will constrain virtually the entire magnetic field to the core.

SiC or GaN wide-band gap (WBG) semiconductors permit power electronics to have an operation frequency at least ten times higher than conventional Si device circuits, up to several MHz. Further, due to the AC characteristics of WBG semiconductors, fewer passive components are required. However, core materials for transformers have frequency limits.

Core losses are an important limitation in most high frequency applications for transformer. Common core losses occur due to a changing magnetic field such as hysteresis loss due to expansion and contraction of magnetic domain from changing magnetic field, eddy current losses due to induced circulating loops of current that generates heat and adds to the resistivity of the core, and skin effect due to increased current concentration at the surface of the conductor thus reducing its effective surface area in turn increasing the resistivity. Further, electromagnetic interference and electromagnetic compatibility are other issues related to high frequency devices.

A toroid shaped magnetic core offers lower core losses compared to other shapes. A wire wound toroid is widely used in several applications. However, the wire winding process can be expensive and results in a sub-optimal toroid configuration. More advanced toroidal core designs offering high quality factor, commonly referred to as Q-factor, which are needed with the increased demand of high frequency operation.

SUMMARY

According to an embodiment of the present disclosure, there is provided an magnetic core apparatus. A magnetic air core apparatus that includes a first toroid formed of a plate like structure wrapped in a helical shape and including an air core, further the plate like structure has an outer peripheral surface and an inner peripheral surface, a second toroid that substantially envelopes the first toroid in a concentric manner. The first and second toroids have a first air gap provided therebetween. A start terminal is connected to the first toroid and a return terminal is connected to the second toroid, the start and return terminals enable connections to other electrical devices.

The width of each turn of the plate-like structure has a varying width. The width of the outer peripheral surface of the first toroid is greater than the width of the inner peripheral surface. Each turn of the plurality of turns of the first toroid is separated by a second gap creating a second capacitor. The first air gap between the second toroid and the first toroid creates a first capacitor having a first capacitance. The first capacitance of the first capacitor can be controlled by varying the first air gap.

The second toroid includes at least one toroidal slot to enable access to the first toroid, at least one poloidal slot to enable access to the first toroid, and at least one terminal slot to connect a terminal to the first toroid and the second toroid.

Further, the first toroid can be configured to allow a first current flow in first direction and the second toroid can be configured to allow current flow in a second direction.

The forgoing general description of the illustrative implementations and the following detailed description thereof are merely exemplary aspects of the teachings of this disclosure, and are not restrictive.

BRIEF DESCRIPTION OF THE DRAWINGS

FIGS. 3B and 3C are a cross-sectional view illustrating the geometry of the surfaced air core.

FIG. 4A illustrates a stray capacitor between coil windings of a wired toroidal core according to an exemplary embodiment of the present disclosure.

FIG. 4B illustrates the stray capacitor between coil windings of a surface air core toroid according to an exemplary embodiment of the present disclosure.

FIGS. 5A and 5B illustrate an intrinsic effect of a current flowing through a typical wired toroidal core and a surfaced air core toroid respectively according to an exemplary embodiment of the present disclosure.

FIG. 6C illustrates the difference in magnetic flux density in a wired toroidal core and a surface air core toroid according to an exemplary embodiment of the present disclosure.

FIG. 7A illustrates a step with excitation current applied to a coil according to an exemplary embodiment of the present disclosure.

FIGS. 11A-11C illustrate power control graphs of a near field wireless power transfer having multiple inputs and multiple outputs according to an exemplary embodiment of present disclosure.

FIGS. 12A-12D illustrate a 3D printing based manufacturing of a surfaced air core toroid according to an exemplary embodiment of present disclosure.

DETAILED DESCRIPTION

Figure 1:
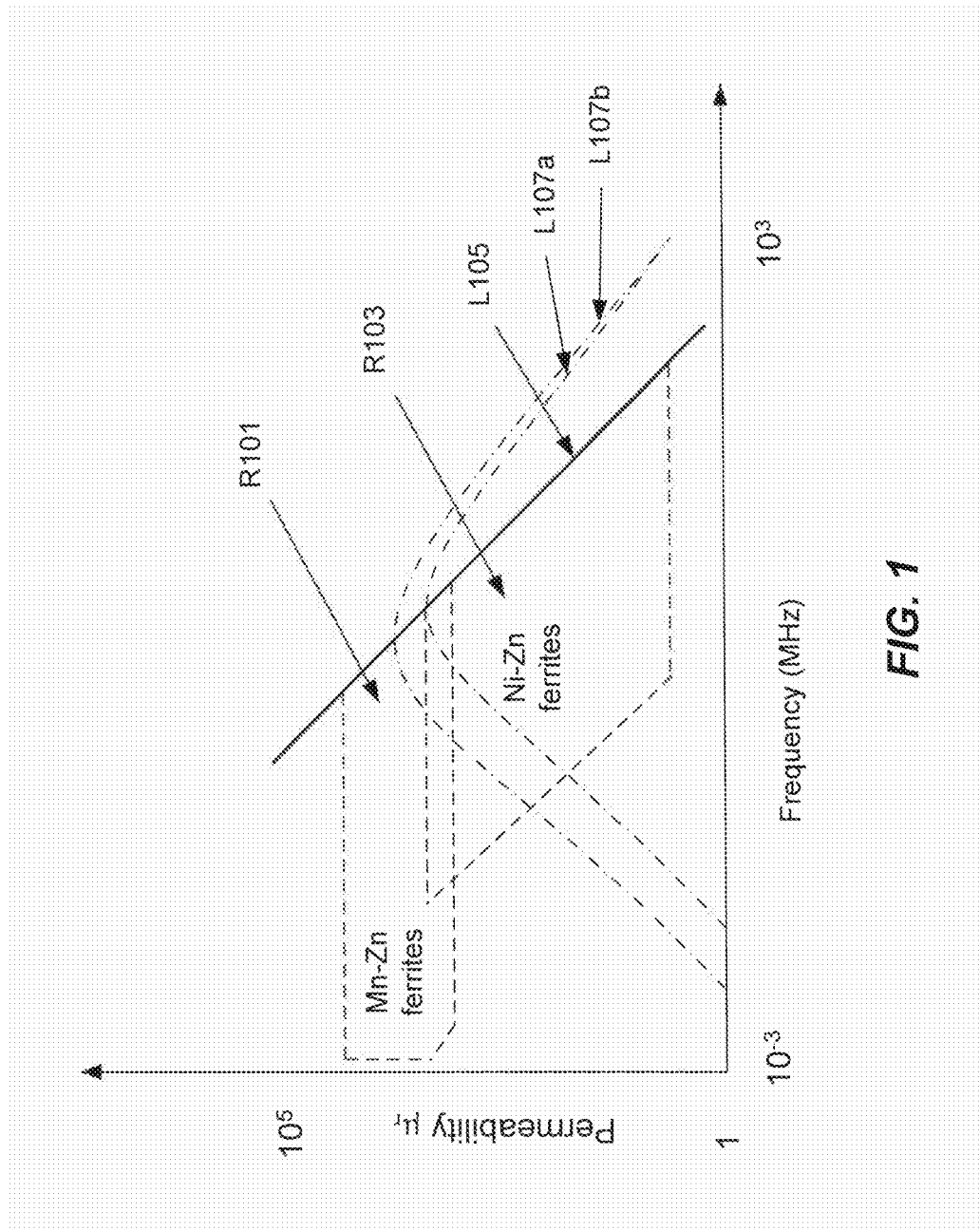
FIG. 1 is a graph illustrating basic characteristics of ferrite magnetic cores.

In the drawings, like reference numerals designate identical or corresponding parts throughout the several views. Further, as used herein, the words "a", "an" and the like generally carry a meaning of "one or more", unless stated otherwise. The drawings are generally drawn to scale unless specified otherwise or illustrating schematic structures or flowcharts.

A high frequency magnetic device can be implemented as a solid toroid using a ferrite material or a toroid with an air core. A device having a ferrite material core has a saturation limit which bounds the maximum flux carried by the ferromagnetic material. Typically, as the magnetic flux increases the ferrite-core's permissivity, the ferrite-core's ability to support formation of a magnetic field decreases. The ferrite-core's permissivity is also affected by the frequency of the operation; however, the permissivity-frequency relationship is highly complex. See for instance FIG. 1.

On the other hand, a high frequency magnetic device having an air core has no ferrite material in the path of the magnetic field. Consequently, it has potentially low losses during a high frequency operation. Further, such a device using an air core does not have a flux saturation limit. Thus, a higher magnetic flux can be support by the air core and multiple inputs and outputs can be connected to one transformer. Further, the high efficiency of the air core and the higher mutual inductance capacity enables design of a contactless, multiple input and output power transmitting device.

FIG. 1 illustrates sample frequency vs. permeability characteristics of Mn—Zn and Ni—Zn ferrite cores. Lines L107a and L107b illustrate the permeability of the ferrite cores as a function of frequency. The ferrite materials offer a trade-off called 'snakes limit', indicated by line L105, beyond which the permeability decreases as the frequency increases.

A high frequency designed transformer not only has a coil with a large number of turns for maintaining exciting inductance, but also has large AC loss caused by the core itself and skin effect. Referring back to FIG. 1, the high-permeability and low-loss materials (Mn—Zn) have a frequency limit around 500 kHz (region R101 of FIG. 1). The lower permeability and larger loss materials composed of Ni—Zn ferrites have a higher frequency limit around 1 MHz (region R103). Consequently most DC-DC converters have an operating frequency under 1 MHz. In contrast, a WBG semiconductor is able to operate over 1 MHz switching. To utilize the WBG switching capability, use of an air core for magnetic components is disclosed herein.

Any poor mutual coupling associated with an air core transformer is overcome by use of resonant inductive coupling, sometimes referred to as LC resonance. Resonant inductive coupling consists of two high quality (Q) coils wound around the same core with capacitors across the winding creating two LC circuits, which may be distributed in the same device or different devices. When an oscillating current is passed through the coil, the LC circuit generates an oscillating magnetic field which produces resonance in the coil. In a resonant coil, any energy placed in the coil dies away relatively slowly over several cycles. If a second coil is brought near the resonant coil, the energy is transferred to the second coil before it is lost, even if the coils are apart. The efficiency equation 1 summarizes the basic operation of the wireless power transfer technology.

$$\text{Efficiency} \propto 1 + \frac{1}{2*K*\sqrt{Q_1*Q_2}} \qquad (1)$$

The efficiency equation 1, indicates that efficiency increases monotonically and approaches 100% with an increase in coupling factor K and quality factors $Q_1$ and $Q_2$ of primary and secondary coils, respectively.

According to the present disclosure, high K and Q factors are achieved by designing a coil with a physical layout which generates the magnetic flux path, while reducing the stray resistances, which are dominant especially for high frequency devices.

Figure 2:
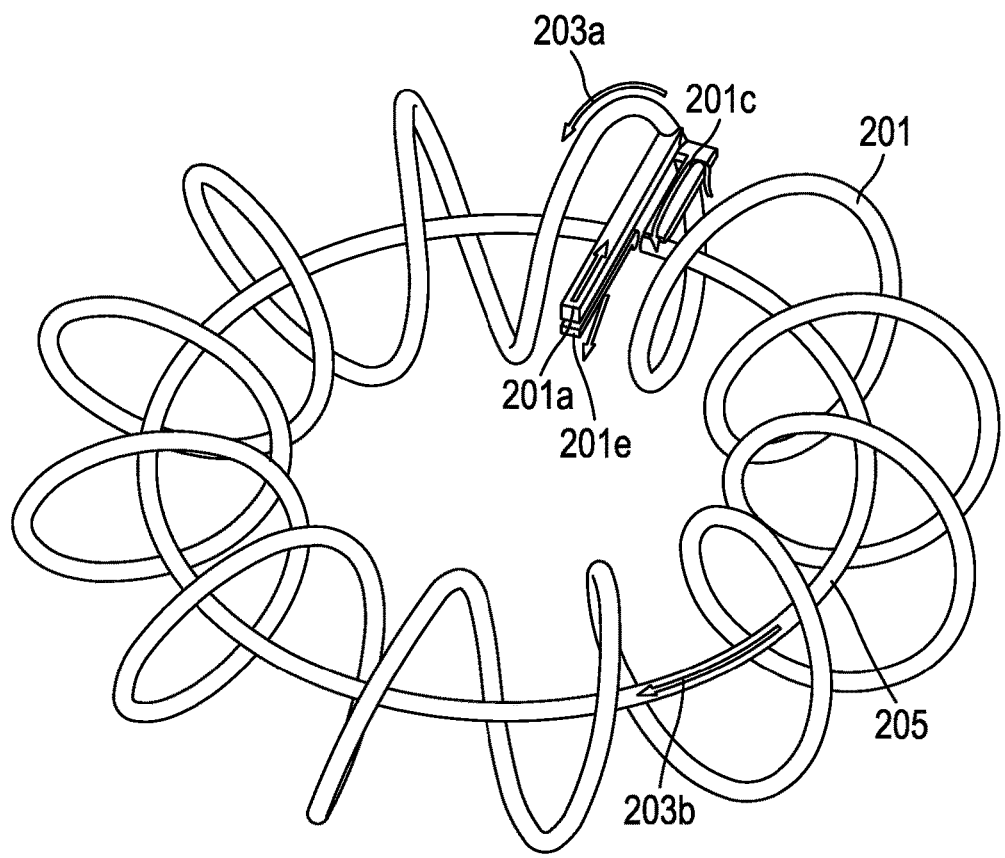
FIG. 2 illustrates a coil design for high accuracy Rogowski current sensor.

FIG. 2 illustrates a conventional coil design composed of wound wire particularly designed for a Rogowski current sensor. A toroidal structure is created from the wire which begins at a start terminal 201 and is wrapped in direction 203a to form a helical shaped toroidal wire 201. A return wire 205 is connected to the end of the toroidal wire 201 at 201c and is wrapped in a reverse direction 203b inside the toroidal wire 201 such that the return wire 205 ends at the return terminal 201e. This turn method cancels Z axis flux interference so it is able to increase the signal to noise ratio if used in a sensor. Alternately, the conventional coil may be composed of a wire wound around a toroidal core made of magnetic material.

Figure 3A:
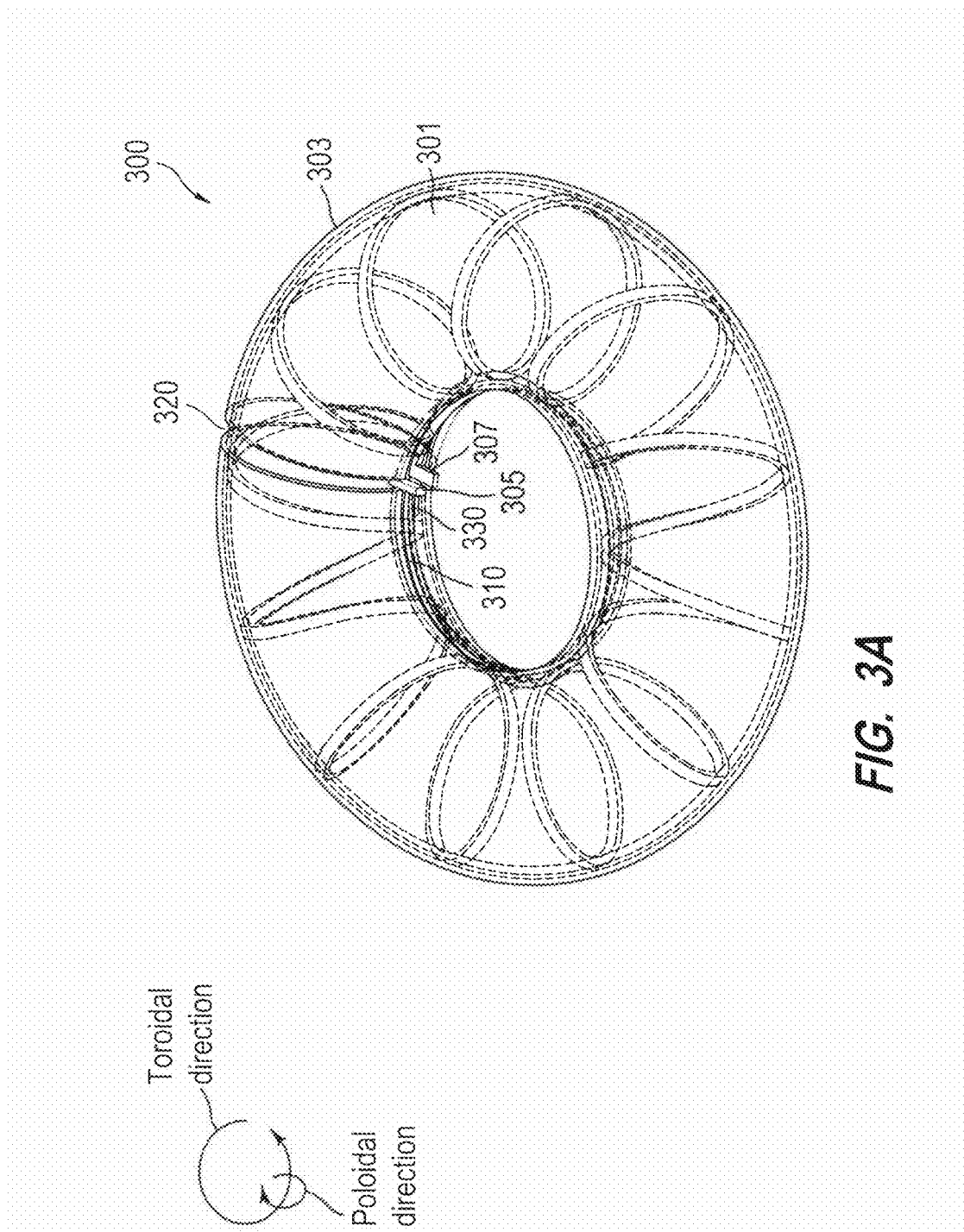
FIG. 3A is a perspective view of an exemplary surfaced air core according to an embodiment of the present disclosure.

FIG. 3A is a perspective view of an exemplary surfaced air core according to the present disclosure. The surfaced air core 300 includes a toroidal winding 301 formed using a plate-like structure, a return winding 303 that encapsulates the toroidal winding, and start terminal and return terminals 305 and 307, respectively. The return winding 303 is a hollow toroid concentric with the toroidal winding 301 and placed outside the toroidal winding 301.

Figure 3D:
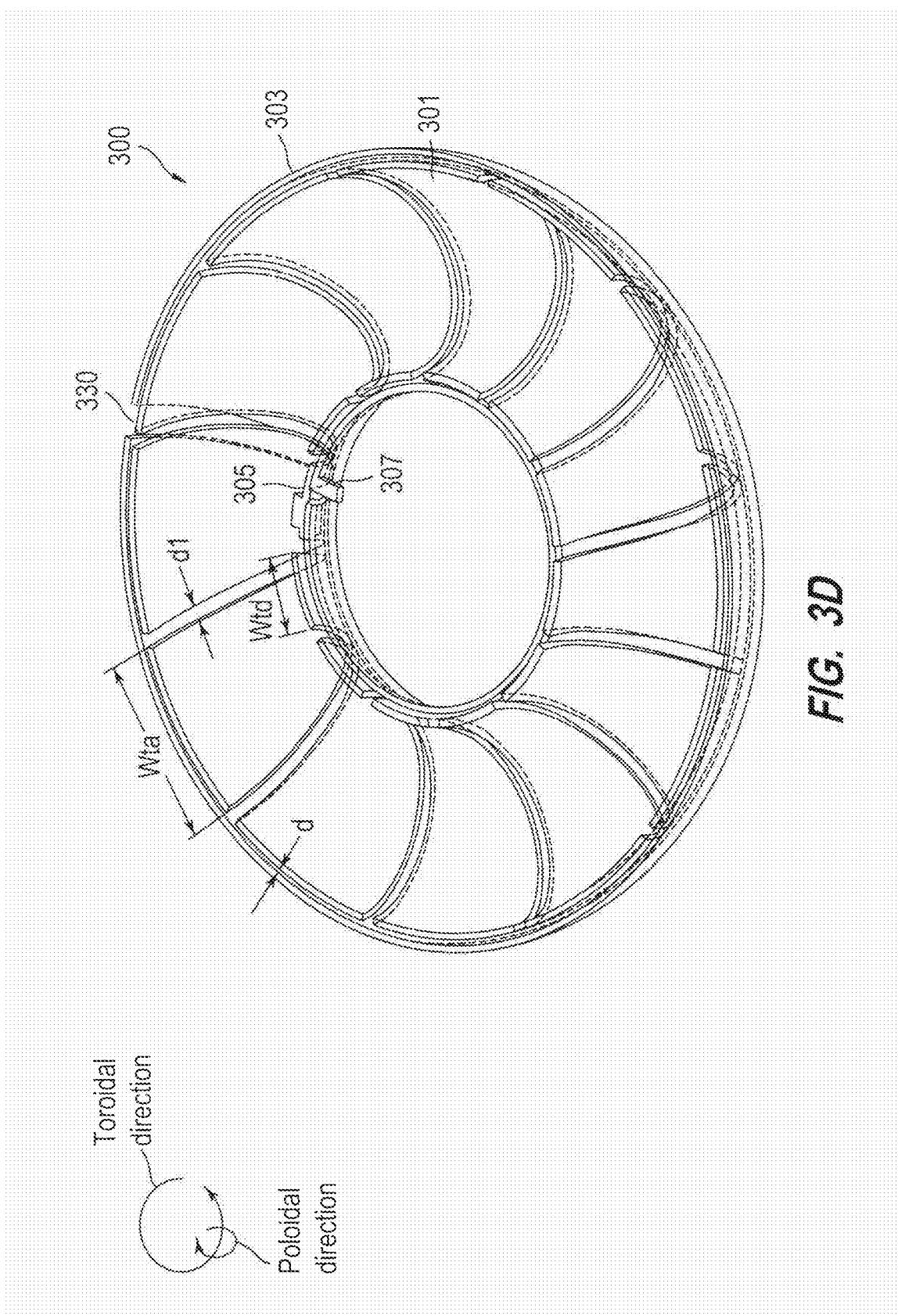
FIG. 3D is a cross-sectional view illustrating the internal structure of the surfaced air core.

The return winding 303 has a toroidal slot 310, a poloidal slot 320, and a terminal slot 330 (not visible in FIG. 3A, see FIG. 3D instead). The toroidal slot 310 restricts the current circulation in a poroidal direction. The poloidal slot 320 restricts the current circulation in a toroidal direction. The terminal slot 330 is provided to access the start terminal 305.

FIGS. 3B and 3C is a cross-sectional view illustrating a geometry of the surfaced air core 300. The toroidal winding has a toroidal radius of R from center O, a poloidal radius r from center O' and a thickness Tt. The toroidal winding 301 is positioned inside and concentric with the return winding 303 and separated by a gap d. The start and the return terminals 305 and 307 are separated from each other. The return winding 303 has a toroidal radius R, a poloidal radius r' and a thickness Tr. The poloidal radius r' may also be calculated as r+d.

The toroidal slot 310 on the return winding 303 has a width Wts. The width Wts may be constant or vary along the toroidal direction. As illustrated in FIG. 3B, the toroidal slot 310 is provided at a poloidal angle θ equal to 180 degrees, which represents the inner radius, R-r', of the return winding 303 and runs through the entire perimeter; however, the toroidal slot 310 may be provided at a different poloidal angle θ from the center e.g., 0=90 degrees, and may not cover the entire perimeter of the return winding 303. The poloidal angle θ is measured from the x or y axis (or horizontal plane) towards the z-axis. The poloidal slot 320 on the return winding 303 has a width Wps. The width Wps may be constant or vary along the poloidal direction.

In one embodiment the gap d between the toroidal winding 301 and return winding 303 may be varied. For instance, a circular clip may be attached on the outside of the return winding 303. The circular clip, such as a hose clamp, can be tightened or loosened thus decreasing or increasing the gap d, respectively. The circular clip enables variability of the gap d, which in turn enables a dynamic capacitance control of the surfaced air core 300.

Further in another embodiment the return winding can be manufactured by connecting small sections such as small circular pipes to create a complete toroidal shape. The sections can be detachable and may be used to change the size of the poroidal slot 320 by removing one or more of the sections. The sectional toroid design enables variability of the width Wps, which in turn enables a dynamic capacitance control of the surfaced air core 300.

FIG. 3D is a cross-sectional view illustrating the internal structure of the surfaced air core 300. The toroidal winding has a plate-like spiral winding along the toroidal direction. The plate-like spiral winding is twisted in a clockwise direction from the starting point 305C and is continuous along the toroidal direction until it returns to the starting point 305C. A small gap d1 is maintained between the two adjacent windings. The gap d1 provides separation between two consecutive turns of the toroidal winding. Further, the gap d1 is a factor in determining the capacitance of the surfaced air core 300. The toroidal winding can have a varying width along the toroidal radius R. For each turn, the outer width Wta towards the outer peripheral surface is wider than the inner width Wtb towards the inner peripheral surface. The gap d1 between plates is usually maintained constant and smaller than the outer width Wta, thus increasing the surface area of a turn. All the turns of the toroidal winding 301 are separated by the gap d between the toroidal winding 301 and return winding 303. The return winding 303 has a continuous surface and is positioned outside the toroidal winding 301.

The start terminal 305 is connected to the return winding 303 and can have a rectangular cross-section. Alternatively, the start terminal 305 may be a hollow circular cross-section. The return terminal 307 is connected to the toroidal winding 301 and can also have a rectangular cross-section. Alternatively, the return terminal 307 may be a hollow circular cross-section. Further, the toroidal winding 301 and the return winding 303 are connected at the connection point 330a visible from the terminal slot 330. The start and the return terminals 305 and 307 are used as inputs and can be connected to a power source (not shown). When the power source is activated, a current starts flowing through the surface air core. Additional terminals may also be provided to connect to multiple inputs or outputs.

Figure 3E:
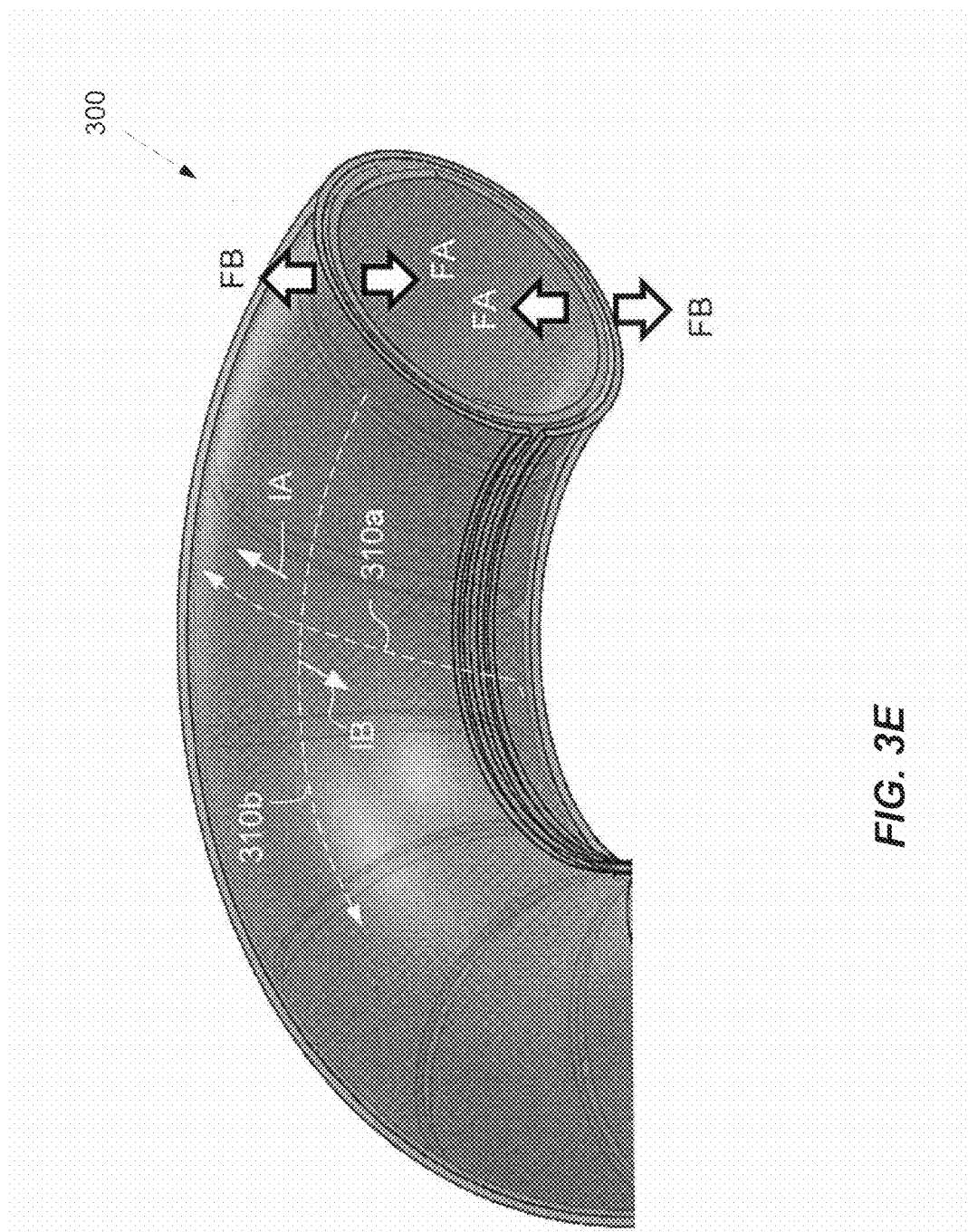
FIG. 3E is a cross sectional view of the surfaced air core illustrating the current flow direction.

FIG. 3E is a cross sectional view of the surfaced air core which illustrates the current flow direction. When a power source (not shown) is connected to the surfaced air core, a current IA flows in the clockwise direction along the toroidal winding 301 in the helical direction 310a and a current IB flows in the counter-clockwise direction and along the toroidal direction 310b in the return winding 303. Thus, the currents IA and IB are flowing in opposite directions. The current IA generates a magnetic force FA directed towards the center of the toroidal winding 301 and a magnetic field BA (not illustrated). Current IB generates a magnetic force FB directed away from the center of the return winding 303 and a magnetic field BB (not illustrated). Due to the closed loop form of the surfaced air core and the symmetry of the structure, the magnetic fields BA and BB are confined within the toroid.

According to an embodiment of the present disclosure, the surfaced air core is a plate-like current carrying conductor and does not include wires wound around a core. As shown in FIG. 3, the surface area of the structure of the return is non-negligible, and it covers the toroidal winding with the narrow gap d. For the surfaced air core, the self-inductance $L_s$ and internal capacitance $C_s$ can be calculated using equations 2 and 3 as follows:

$$L_s = \mu_0 \mu_r \frac{N^2 r^2}{2R} \tag{2}$$

$$C_s = \epsilon_0 \epsilon_r \frac{4\pi^2 rR}{d} \tag{3}$$

In the above equations 2 and 3, N is the toroidal turn number, R is the toroidal radius, r is the poroidal radius, $\mu_0$ is a constant for the permeability of space, $\mu_r$ is the relative permeability of the core, $\epsilon_0$ is the electric constant, $\epsilon_r$ is the relative static permittivity of the material between the plates, and d is the distance between the toroidal surface and the return structure.

At a resonant point the resonant frequency $f_{res}$ and quality factor Q can be calculated using equations 4 and 5 as follows:

$$f_{res} = \frac{1}{2\pi\sqrt{L_s C_s}} \quad (4)$$

$$Q = \frac{2\pi L_s}{R_s} \quad (5)$$

In the above equations 4 and 5, R, is the total stray resistance of $L_s$ and $C_s$. The surfaced air core according to the present disclosure has three features to create high KQ for LC resonance operation including: a low equivalent series resistance (ESR) capacitor (high Q operation), a reduced intrinsic effect (high Q operation), and a flux packing effect (high K operation).

Sample parameters used are presented in table 1 for the surfaced air core according to the present disclosure.

TABLE 1

Sample parameters of the surfaced air core

| | Parameter | | | | | | | |
|---|---|---|---|---|---|---|---|---|
| | R (mm) | r (mm) | d (mm) | N | Lr | Er | Ls (nH) | Cs (nF) | $f_{res}$ (MHz) |
| Value | 9 | 4.5 | 0.01 | 12 | 1 | 2.2 | 118 | 23 | 3 |

To achieve LC resonance, conventional wired winding requires additional capacitance to set the operation frequency. Consequently, the stray resistance caused by the terminals or capacitor ESR decrease Q. Referring to FIG. 4, the surfaced air core structure according to the present disclosure creates an internal capacitance $C_s$ without the need for additional capacitance. Further, the internal capacitance of the surface air core may be adjusted by varying gap size d1 or inserting a dielectric material within the core. Further, the toroidal winding resistance and the resistance of the capacitor Cx, generated due to the gap d between the toroidal winding and return winding, are shared. For example, the resistance from Cx1, Cx2, Cx3 are shared between the toroidal winding 301 and return winding 303. So, the total stray resistance for the surfaced air core is smaller than for the wired coil. Also, the surfaced air core according to the present disclosure integrates LC into one object while maintaining a high Q value.

FIGS. 5A and 5B illustrate the intrinsic effect caused by the magnetic force between the two different directional currents in a toroid core. FIG. 5A shows the intrinsic effect for the toroid wire 201 of the wired coil 200. The wired coil impedance is increased since the skin effect at higher frequency causes a significant increase in the resistance and the current is concentrated at the inner portion of the toroidal conductor. An increased surface area of the current carrying conductor reduces the resistance. As such, the surfaced air core 300 has a lower resistance Rs, which in turn increases the Q-factor as defined in equation 5.

FIG. 5B illustrates simulation results confirming the intrinsic effect reduction obtained by the surfaced air core structure of the present disclosure. When the current IB is flowing in a counter-clockwise direction in the return wire 303, a magnetic force-field FB is created in an outward direction, i.e. away from the center of the circle. Similarly, when the current IA is flowing in a clockwise direction in the toroidal winding 301, a magnetic force-field FA is created in an inward direction (i.e., towards the center of the circle). The direction of the magnetic force-fields FB and FA are in opposite direction, hence they have a cancelling effect and the effective magnetic force field in the surfaced air core is reduced.

In general, for a conductor carrying current, a magnetic force is inversely proportional to the distance from the conductor and directly proportional to the current density. A lower magnetic force indicates a lower current density in a conductor. A lower current density implies a higher surface is available for the current to flow, as such a lower resistance is observed. It is well known that resistance is directly proportional to the length and inversely proportional to the surface area. Further, the current density of return winding 303 should be lower than the current density of the toroidal winding 301. So, effectively, the surfaced air core will have more balanced current density in the toroidal coil and the effective resistance of the surfaced air core is low. This effect contributes to a high Q enabling efficient power transmission.

Figure 6B:
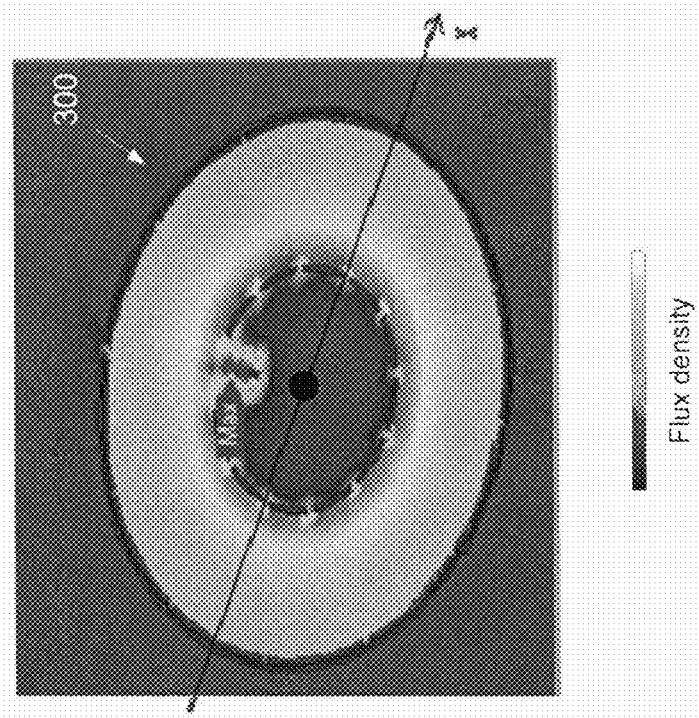
FIG. 6B shows exemplary simulation results of magnetic flux density generated in a surface air core according to an exemplary embodiment of the present disclosure.
Figure 6A:
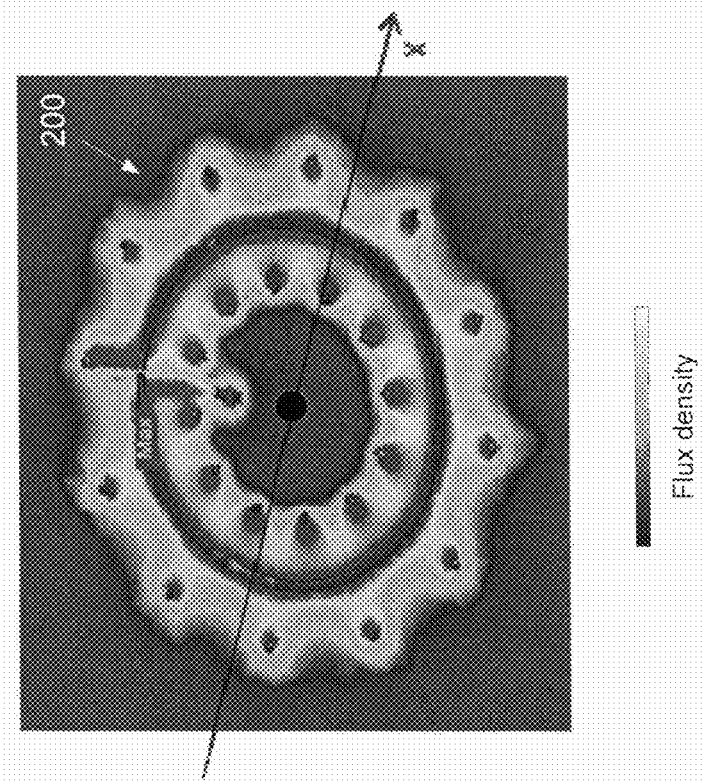
FIG. 6A shows exemplary simulation results of magnetic flux density generated in a wired toroidal core according to an exemplary embodiment of the present disclosure.

FIGS. 6A-6C illustrate differences in the flux density effect when current is passed through the conventional wired core and the surfaced air core according to the present disclosure, respectively. The amount of current passed through the conventional wired coil 200 and the surfaced air core coil 300 according to the present disclosure is the same. The frequency is set to the resonant point, which can be determined from the LC value of the surfaced air core. FIG. 6A illustrates that the wired core 200 with inside return wire 205 (not shown) has an uneven distribution of flux. A higher flux density is observed close to the windings, maximum but unevenly distributed flux is observed in the innermost part of the wired coil. FIG. 6B shows that the surface air core 300 has regulated flux and less leakage compared to the wired coil type. Maximum flux is uniformly distributed at the innermost part of the surfaced air core. FIG. 6C further illustrates the flux density distribution with respect to the distance X. Along the X axis a coil 601 with center O is marked. The coil 601 may be of wired or surfaced air core type. The circles 605a and 605b represent the cross-section of the coil 601. The flux is distributed around the coil 601. The graphs illustrates that the flux distribution of conventional wired coil, curve 610, is irregular and has a higher flux density, more than 20 mT, outside the wired coil region. On the other hand, curve 620 indicates that the surfaced air core has a lower flux density outside the coil, less than 5 mT, increases sharply within the toroid and falls sharply towards the center of the coil. Less leakage flux outside the surfaced air core coil indicates low electromagnetic interference to outside devices, and lower disturbances from outer material such as windings, circuit boards, and other metallic material.

Figures 7B, 7C:
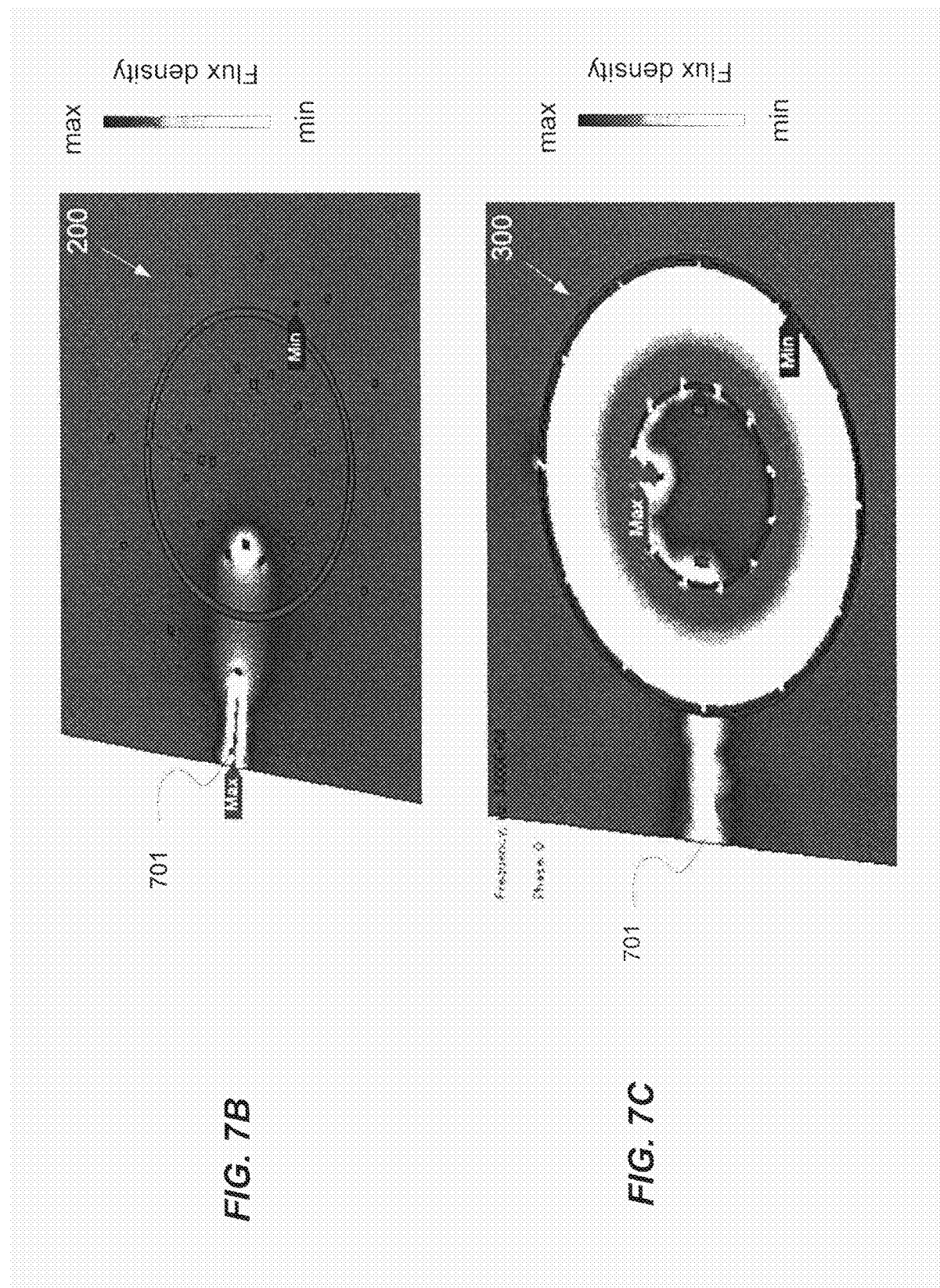
FIGS. 7B and 7C shows exemplary simulation results of magnetic flux density generated in a wired toroidal core and a surface air core respectively according to an exemplary embodiment of the present disclosure.
Figure 7D:
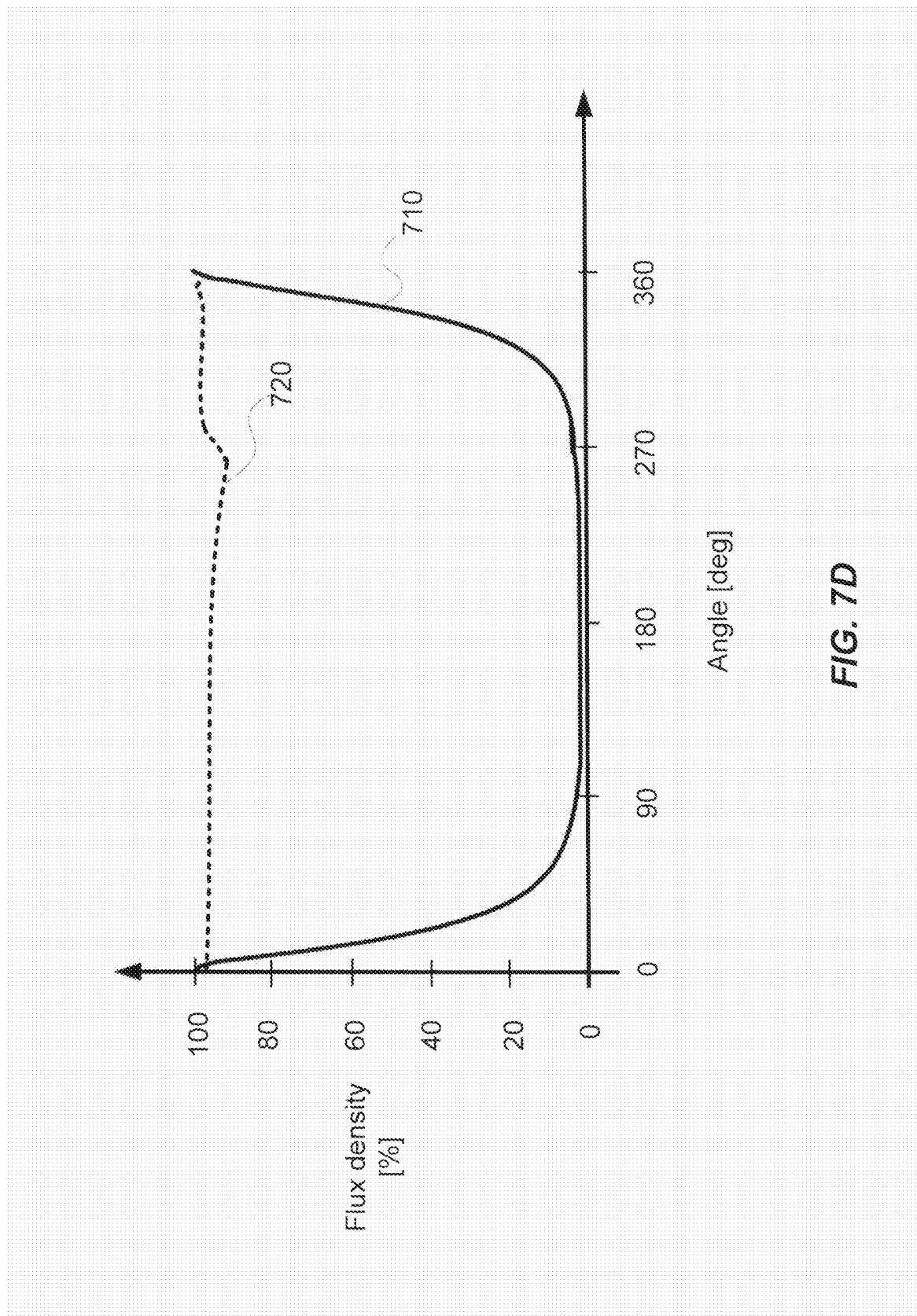
FIG. 7D is a graph that illustrates the difference in magnetic flux density in a wired toroidal core and a surface air core toroid according to an exemplary embodiment of the present disclosure.

FIGS. 7A-7D illustrate differences in the flux density effect when an excitation from an outer winding is applied to the conventional wired core and the surfaced air core according to the present disclosure. FIG. 7A illustrates the setup for measuring the flux density effect for the conventional wired core. An excitation coil 701 is driven by a current of 1 ampere. The frequency is set as the resonant point $f_{res}$ determined by the LC value of the surfaced air core coil. FIG. 7B shows that the magnetic flux density is minimized at the center of wired core 201 and is maximum where the excitation coil 701 is connected. FIG. 7C shows that the magnetic flux density at the surfaced air core 300 is maximum in the toroidal winding 301 and minimum in the return winding 303. The flux density distributions of FIGS. 7B and 7C are further illustrated in the graph of FIG. 7D. The curve 710 in the graph indicates the wired coil has a higher percentage of flux density concentrated around the primary coil i.e., from 0 to 45 degrees and from 325 to 360 degrees, while away from the primary coil i.e., from 90 to 270 degrees, the flux density in the coil is almost zero. On the other hand, the curve 720 indicates the surfaced air core has much more regulated flux density throughout the coil.

As discussed above, the surfaced air core according to the present disclosure is highly efficient and can potentially have several applications such as a sensor, an induction motor, a high frequency transformer, a wireless charger, a filter etc. For instance, sensors with higher measurement accuracy can be created using the surfaced air core. The sensor can measure current through a conductor carrying current placed in the vicinity of the surfaced air core by measuring the change in magnetic flux around the current. Because of its metal plate characteristics, the sensor will sense only the magnetic flux inside of the toroid as opposed to a wired coil configuration.

Figure 8B:
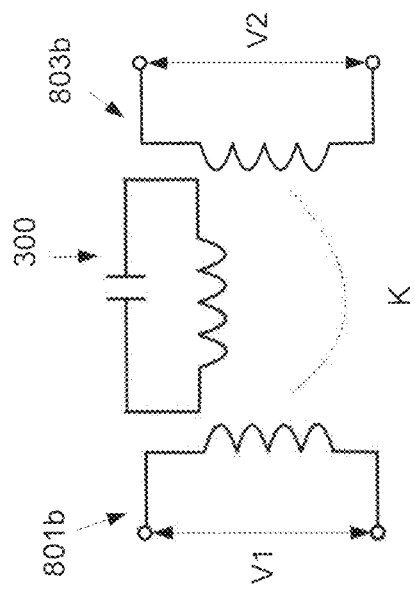
FIG. 8B illustrates the operation circuit of the transformer in FIG. 8A according to an exemplary embodiment of the present disclosure.
Figure 8A:
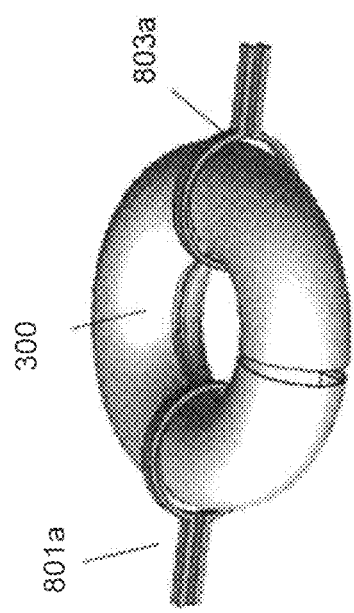
FIG. 8A is an exemplary application of the surfaced air core as a transformer according to an exemplary embodiment of the present disclosure.
Figure 8C:
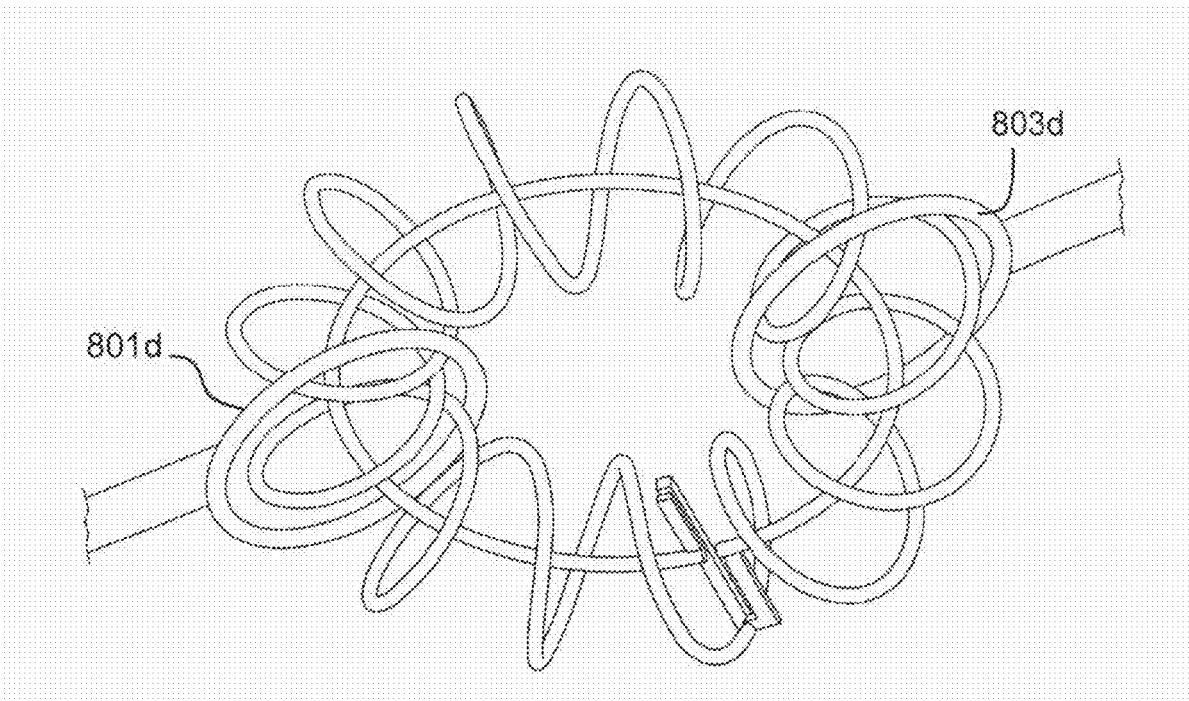
FIG. 8C shows an exemplary magnetic flux distribution for the transformer setup in FIG. 8A according to an embodiment of present disclosure.

FIGS. 8A-8C illustrate application of the surfaced air core coil to a transformer. FIG. 8A illustrates the physical setup for a transformer operation. A primary winding 801a is attached around the surfaced air core 300 and a secondary winding 803b, opposite to the primary winding 801a, is attached around the surface air core 300. FIG. 8B illustrates the circuit diagram in which the primary and secondary windings 801b and 803b, respectively, are wound on the surfaced air core 300, and input voltage $V_1$ excites primary coil 801a at $V_1$=10 V. The secondary winding 803b has a voltage V2 proportionate to the crossed magnetic flux excited by the primary winding 801b. FIG. 8C show the simulation results of the circuit in FIG. 8B. In this study, a coupling ratio K between primary coil and surfaced air core coil reached greater than 0.8, approximately 0.88.

Figure 8D:
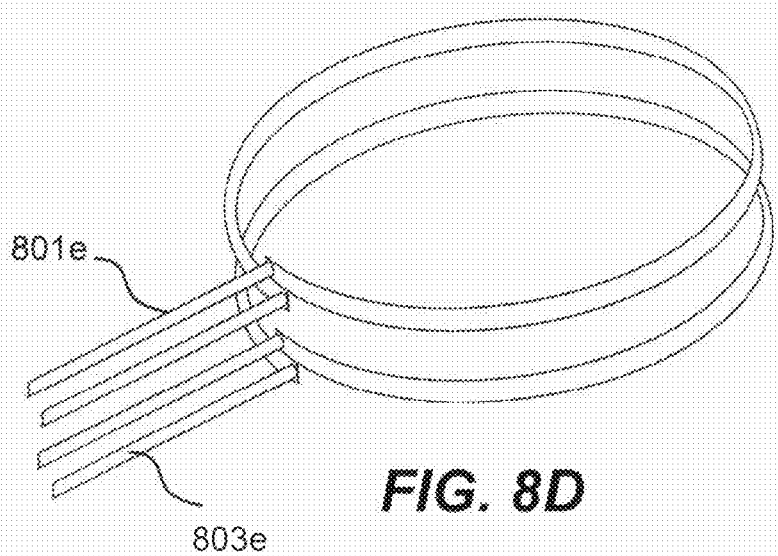
FIG. 8D compares the coupling ratio of a flat wire and a toroidal wire core structures used in a transformer according to an exemplary embodiment of present disclosure.

FIGS. 8C and 8D and show a comparison of the coupling ratio for other types of core structure such as wire wound in helical form, in FIG. 8C, and wire wound in a circular form, in FIG. 8D. For instance, referring to FIG. 8C, the K-value for a toroidal wire coil connected to a primary 801d and a secondary 803d is 0.5. On the other hand, referring to FIG. 8D, the K-value for wires wound in a circular form 801e and 803e is 0.1. Thus, for a surfaced air core according to the present disclosure, the coupling ratio K approximately equal to 0.88 is significantly higher than the other air core designs such as wire wound in helical form and wire wound in a circular form.

Figure 9B:
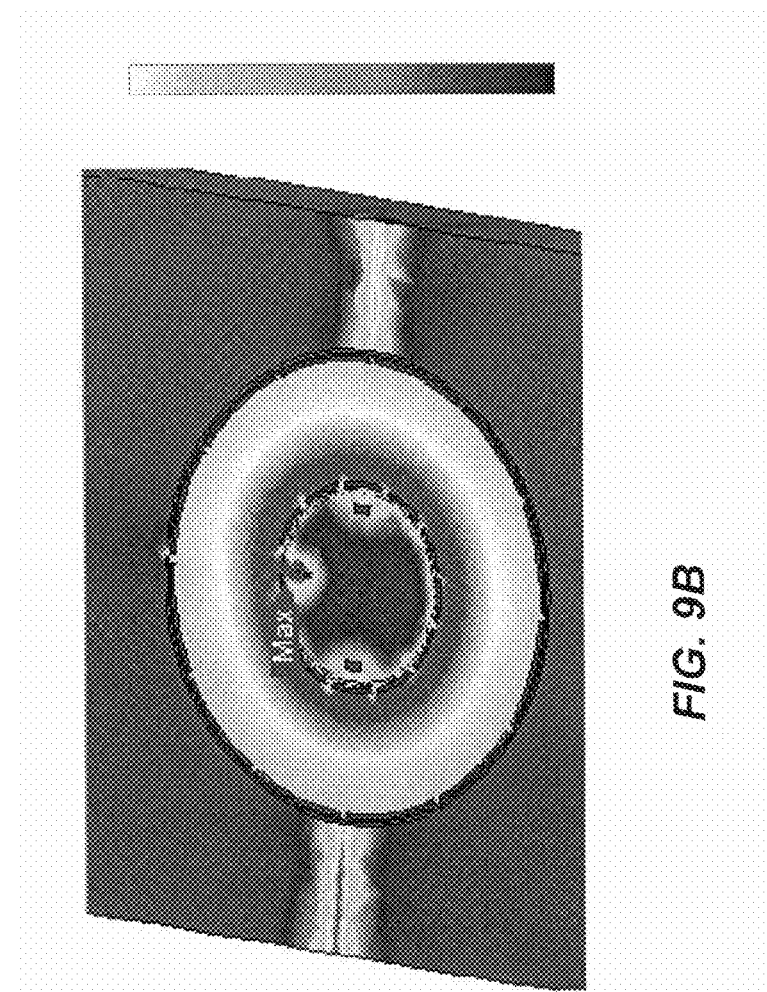
FIG. 9B shows a sample simulation result of magnetic flux density distribution in a surfaced air core toroid used in FIG. 9A.
Figure 9A:
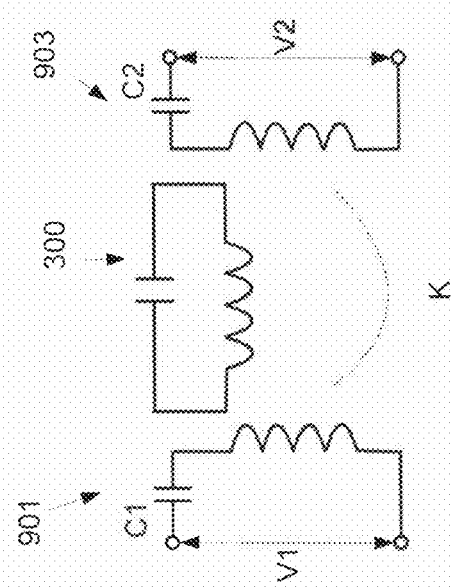
FIG. 9A illustrates an operation circuit employing a surfaced air core toroid for magnetic resonance wireless power transmission operation according to an embodiment of the present disclosure.
Figure 9C:
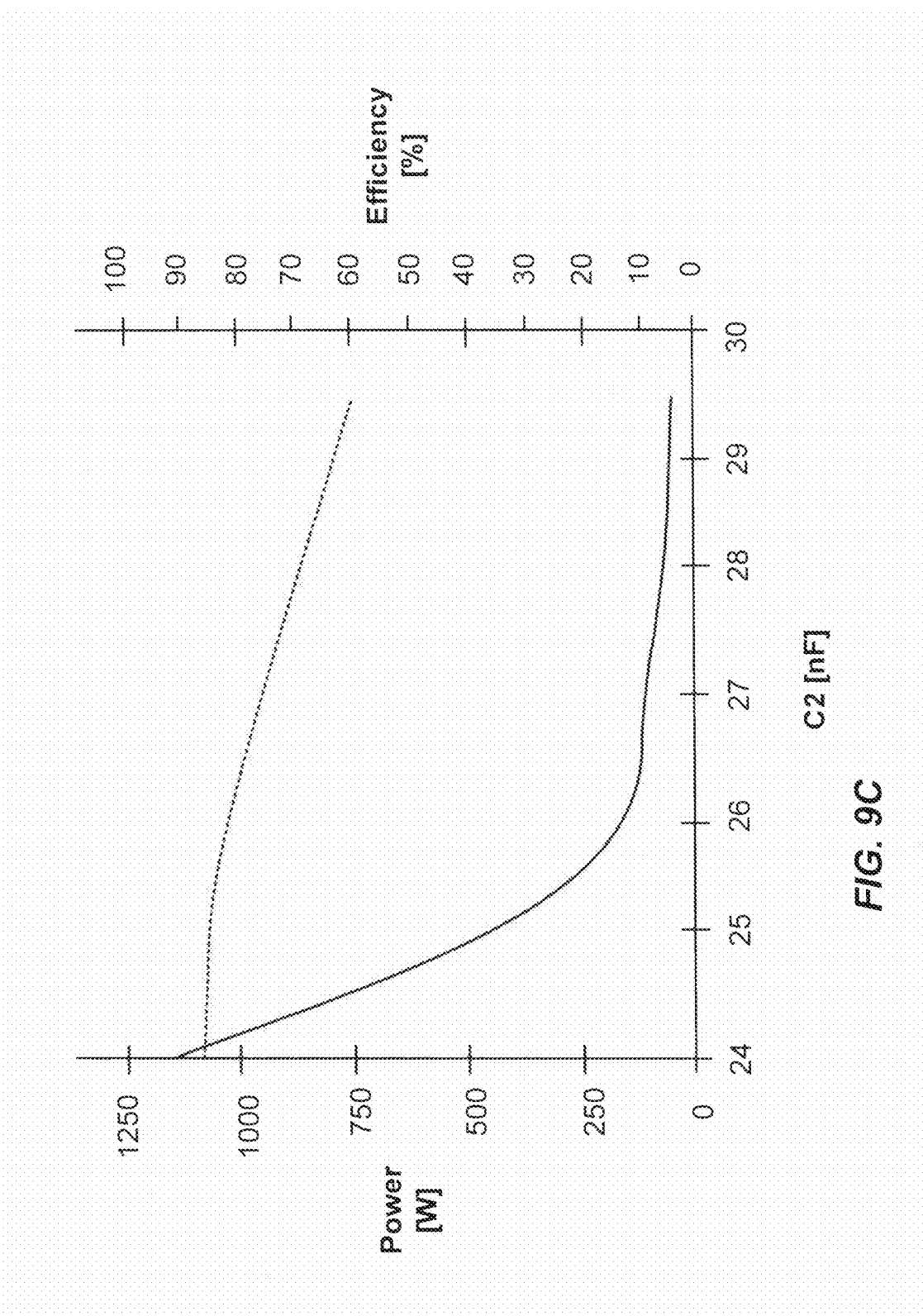
FIG. 9C is a graph that illustrates the magnetic flux distribution, the power transmission and the efficiency as the capacitance varies according to an exemplary embodiment of present disclosure.

FIGS. 9A-9C illustrate application of the surfaced air core structure to a wireless power transmission application. FIG. 9A is a circuit diagram for wireless power transmission using the surfaced air core. The primary and secondary windings 901 and 903 connect series capacitors C1 and C2, respectively, for wireless transmission operation. AC power transmits from primary winding 901 to secondary winding 903 through the surfaced air core coil 300, which acts as a repeating coil. The power is repeatedly transferred from primary winding 901 to secondary winding 903 via magnetic induction. FIG. 9B shows the simulation result for the magnetic flux density distribution. The magnetic flux is packed inside the toroidal winding 301 when it is operated as a repeating coil. A maximum flux density is observed in the center of the toroidal winding 301, while in the rest of the toroid the flux is evenly distributed with very little leakage flux. FIG. 9C illustrates variation in the transmitting power and the efficiency as the secondary capacitance C2 changes. The efficiency reaches 86% at resonant frequency when a secondary capacitance of 24 nF is used. The transmitting power can be controlled by changing the secondary (receiver side) capacitance C2. For instance, as the secondary capacitance C2 is increased the power transmitted decreases exponentially. Hence, a lower secondary capacitance C2 is desired for higher power transmission.

Figure 10:
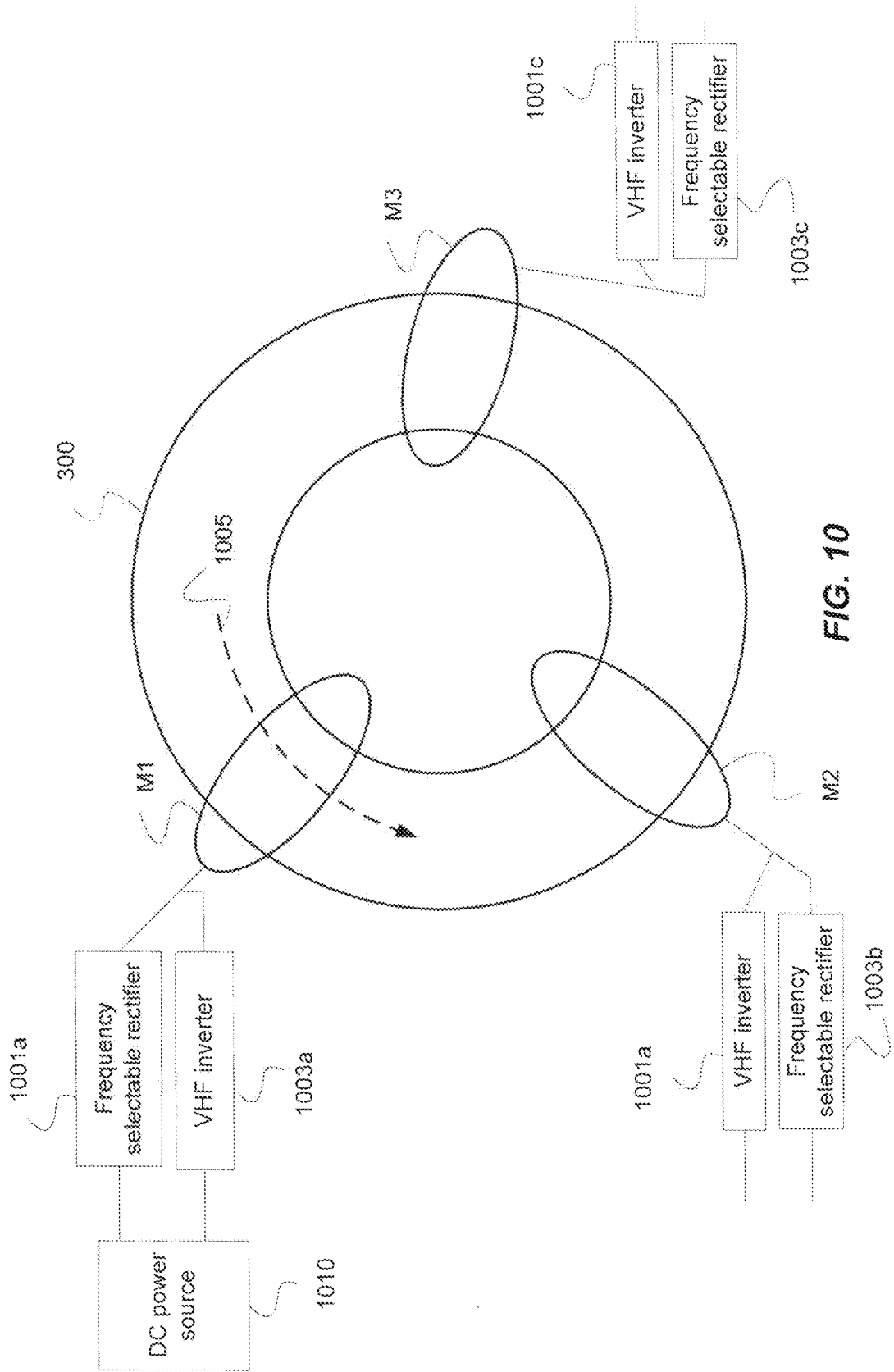
FIG. 10 illustrates a near field wireless power transfer step up employing surfaced air core toroid transformer with multiple outputs.

FIG. 10 illustrates application of the surface air core to a multiple input and multiple output power transfer configuration. In this example, three modules are each fitted with a frequency selectable rectifier and a very high frequency (VHF) inverter. Module M1 is the source of power and modules M2 and M3 are receivers. From module M1 the primary DC power 1010 is converted to AC through a very high frequency (VHF) inverter 1001a, where the AC current is set at the resonant frequency $f_{res}$ by the frequency selectable rectifier 1003a. The AC current has a resonant frequency which creates a resonant magnetic flux 1005 in the surfaced air core. The power transmission has a peak efficiency at the resonant frequency $f_{res}$, as discussed earlier, with reference to FIG. 9C. Modules M2 and M3 are connected to a frequency selectable receiver 1003b and 1003c, respectively, and a VHF inverter 1001b and 1001c respectively. Module M2 receives AC power from the surfaced air core 300 and is rectified to produce DC power via the frequency selectable rectifier 1003b. Similarly, module M3 receives AC power from the surfaced air core 300 and is rectified to produce DC power via the frequency selectable rectifier 1003c. The above setup can produce various modes of operation based on the receiving 1 frequency of modules M2 and M3. For example, in complete mismatch mode both M2 and M3 are set at a frequency outside the frequency range of module M1. In partial mismatch mode, module M2 is set close to the resonant frequency $f_{res}$, while module M3 is set at a frequency outside the frequency range of the module M1. In energy distribution mode both modules M2 and M3 are set at frequencies within the frequency bandwidth of module M1. The power transmission characteristics of each mode are illustrated in FIGS. 11A-11C.

FIG. 11A illustrates the power distribution for complete mismatch mode. In this mode, modules M2 and M3 are outside the frequency bandwidth of module M1 or out-of-phase with module M1. All the power is stored as reactive power and there is no net transfer of energy. FIG. 11B is the case where module M2 is set at the same resonating frequency as module M1 or in other words module M2 is in phase with module M1, while module M3 is out-of-phase with module M1. In this case, energy transmits from module M1 to module M2. Module M2 absorbs most all of the AC power while no power is transferred to module M3. FIG. 11C illustrates the power distribution in the energy distribution mode. Modules M2 and M3 are using different frequency receivers both within the frequency bandwidth of module M1. In this case, power is partially absorbed by module M2 and partially by module M3.

FIGS. 12A-12D illustrate a sample fabrication of the surfaced air core using a three-dimension (3D) printing technique. First a 3D computer assisted drawing (CAD) model of the toroidal winding 301 and return winding are constructed. The geometry of the surfaced air core inductor was illustrated in FIG. 3. Then the 3D CAD model of the surface air core is printed using a 3D printer. The 3D printer may employ a metal, plastic or other suitable material to produce a physical 3D artifact. The physical artifact may be manufactured as a single unit or in parts. Individual parts may be 3D printed and assembled to produce the final physical 3D artifact. In an embodiment of the present disclosure the surfaced air core is manufactured in parts and assembled to produce the final physical 3D artifact of the surfaced air core. FIGS. 12A-12C are images of different parts of the surfaced air core 300. The return winding is manufactured in two parts 303a and 303b as shown in FIGS.

12A and 12C, while the toroidal winding 300 is manufactured as a single unit as shown in FIG. 12B. Referring to FIG. 12D, the return winding halves 303a and 303b are assembled around the toroidal winding 301 to build the surfaced air core 300. The return winding halves 303a and 303b can be joined together using various joining methods such as welding or laser sintering. Further, each part of the surfaced air core can be fabricated using different materials or a combination of materials such as sterling silver and copper, two very good electrically and thermally conductive material.

Alternatively, the 3D printer can use a castable material such as plastic to produce the physical 3D artifact of the surfaced air core. A plastic mold of the toroidal winding and the return winding of the surfaced air core may be created. The inductor can be printed in resin using a low cost stereo-lithography or laser sintering 3D printer. Further, the plastic mold of the toroidal winding and the return winding of the surfaced air core inductor can be used in the casting process to fabricate the surface air core from desired material such as ferrite.

The surface air core manufacturing is not limited to 3D printing techniques. Alternatively, several other techniques may be used to manufacture the surface air core. For instance, a toroidal winding of desired geometry can be fabricated by passing a sheet metal of sterling silver, for instance, through rollers followed by molding or 3D printing of the return winding over the toroidal winding. Depending on the material used, additional heat treatment may be required before passing the sheet metal through the rollers or before the molding process. The simulation results of this model is shown in FIG. 9B.

It should be understood that this technology when embodied is not limited to the above-described embodiments and that various modifications, variations and alternatives may be made of this technology so far as they are within the spirit and scope described thereof.

What is claimed is:

1. A magnetic air core apparatus, comprising:
    a first toroid formed of a plate like structure continuously wrapped in a helical shape having a substantially circular cross-section, and including an air core, the plate like structure having an outer peripheral surface and an inner peripheral surface, a width of each turn of the plate-like structure varies in width, and a gap between successive turns is straight, has a constant width, and is angled in a radial direction of the first toroid;
    a second toroid substantially enveloping the first toroid in a concentric manner, the first and second toroids having a first air gap provided therebetween;
    a start terminal connected to the first toroid; and
    a return terminal connected to the second toroid, the start and return terminals enabling connection to other electrical devices,
    wherein the second toroid includes at least one poloidal slot to enable access to the first toroid, and the poloidal slot has a notch adjacent thereto to allow access to the start and return terminals.

2. The magnetic air core apparatus according to claim 1, wherein a width of the outer peripheral surface of the first toroid is greater than a width of the inner peripheral surface.

3. The magnetic air core apparatus according to claim 1, wherein the gap between successive turns creates a second capacitor.

4. The magnetic air core apparatus according to claim 1, wherein the second toroid includes at least one toroidal slot to enable access to the first toroid.

5. The magnetic air core apparatus according to claim 1, wherein the second toroid includes a plurality of sections, wherein each of the plurality of the sections is removably attached to change a length of the at least one poloidal slot enabling a dynamic control over the first capacitance of the first capacitor.

6. The magnetic air core apparatus according to claim 1, wherein the first toroid and the second toroid are configured to hold the magnetic flux uniformly within the air core.

7. The magnetic air core apparatus according to claim 1, wherein the second toroid is configured to act as a transformer.

8. The magnetic air core apparatus according to claim 1, wherein the second toroid is configured to act as a wireless power transfer device.

9. The magnetic air core apparatus according to claim 1, wherein the first air gap between the second toroid and the first toroid creates a first capacitor having a first capacitance.

10. The magnetic air core apparatus according to claim 9, wherein the first capacitance of the first capacitor can be controlled by varying length of the first air gap.

11. The magnetic air core apparatus according to claim 10, wherein a flexible circular clip attached to the second toroid varies a length of the at least one toroidal slot and the first air gap enabling a dynamic control over the first capacitance of the first capacitor.

12. The magnetic air core apparatus according to claim 1, wherein the first toroid is configured to allow a first current flow in first direction and the second toroid is configured to allow a second current flow in a second direction.

13. The magnetic air core apparatus according to claim 12, wherein the first direction of the first current flow is opposite to the second direction of the second current flow.

14. The magnetic air core apparatus according to claim 1, wherein the second toroid is configured to connect a plurality of input devices and a plurality of output devices.

15. The magnetic air core apparatus according to claim 14, wherein the plurality of input devices can be configured to operate at a same frequency as the surfaced air core or at a different frequency than the surfaced air core.

16. The magnetic air core apparatus according to claim 14, wherein the plurality of output devices can be configured to operate at a same frequency as the surfaced air core or at a different frequency than the surfaced air core.

* * * * *